June 19, 1934. S. RUBEN Re. 19,218

LIGHT SENSITIVE DEVICE

Original Filed June 30, 1930 3 Sheets-Sheet 1

INVENTOR
SAMUEL RUBEN
BY
ATTORNEY

INVENTOR
SAMUEL RUBEN
BY
ATTORNEY

INVENTOR
SAMUEL RUBEN
BY
ATTORNEY

Reissued June 19, 1934

Re. 19,218

UNITED STATES PATENT OFFICE 19,218

LIGHT-SENSITIVE DEVICE

Samuel Ruben, New Rochelle, N. Y., assignor to Ruben Tube Company, New Rochelle, N. Y., a corporation of Delaware Original No. 1,941,494, dated January 2, 1934, Serial No. 464,838, June 30, 1930. Application for reissue March 31, 1934, Serial No. 718,472

22 Claims. (Cl. 136—89)

This invention relates to devices which are electrically responsive to light variations.

This application is a continuation in part of my co-pending applications S. N. 301,684 filed 23 August 1928; S. N. 306,607 filed 17 September 1928; S. N. 331,943 filed 11 January 1929; S. N. 347,726 filed 16 March 1929; S. N. 412,077 filed 6 December 1929 (now Patent No. 1,941,493, dated January 2, 1934) and S. N. 424,509 filed 30 January 1930.

One of the objects of the invention is to provide a light-sensitive device which will respond uniformly to light variations throughout the visible range and at audio frequencies.

Another object of the invention is to provide a light-sensitive device which will operate without material electrolytic action.

Another object of the invention is to provide a light-sensitive device which will operate without material local chemical effects.

Still another object of the invention is to provide a light-sensitive cell which is adaptable to quantity production with uniform electrical characteristics.

Another object of the invention is to provide a light-sensitive cell which has substantially no local chemical or electrolytic effects during non-use thereof.

A further object of the invention is to provide a light-sensitive device which has a minimum potential drop across the terminals thereof when the device is dark.

Another object of the invention is to provide a light-sensitive device which is operable in a circuit with a continuous flow of pulsating current.

Still another object of the invention is to provide a light-sensitive device having a low impedance.

A still further object of the invention is to provide an inexpensive light-sensitive cell which is very simple, has few parts, and is capable of withstanding extremely hard usage with substantially no effect upon the operation thereof.

Other objects of the invention and objects relating particularly to the methods of constructing the various parts and to the circuit for using the device will be apparent as the description of the invention proceeds.

As disclosed in my United States Letters Patents 1,694,189 and 1,694,190, cuprous oxide, under certain conditions, is light sensitive. I have now found that if properly prepared and used in cooperation with other suitable materials, that it is not only light sensitive in the ordinary sense, but it may be made to respond to high frequency light variations, such as in the order of 6000 cycles. In this invention, the light-sensitive electrode itself comprises a copper base having a thermally-integrally-formed cuprous oxide surface. This electrode is positioned in a container filled with a conductive medium in such a manner as to receive light thrown upon the cuprous oxide surface. A cooperating electrode formed of a suitable metal is positioned in proximity to the light sensitive electrode.

I have found by careful experimentation that some of the factors which may aid in attaining the objects stated above may be outlined as follows:

1. The copper-cuprous oxide electrode should be etched.

2. The conducting medium or electrolyte is preferably one having an acidic reaction or a tendency to form an acidic solution of a salt.

3. The conducting medium may be such that it will not chemically dissolve the light-sensitive material to form a surface product which might prevent light from reaching the light-sensitive material due to the film formed upon it or due to the light absorption of the conducting medium.

4. The metal serving as the cooperating electrode for the light-sensitive material may be chosen so that there is a minimum difference of potential between it and the light-sensitive electrode when mounted in the device. Thus chemical effects or electrolytic effects either in the dark, or when not used, or where a conductive circuit is employed may be maintained at a minimum.

5. The conducting medium may be such as not to appreciably dissolve or otherwise chemically react with the cooperating electrode thus avoiding the formation of a surface product or a polarization potential.

6. The conducting medium may also preferably be capable of maintaining the sensitive condition of the light-sensitive surface.

7. The conducting medium may also be chemically stable at all times whether in use or not in use and it may preferably have a high decomposition potential.

8. Where a liquid conducting medium is used the concentration thereof may preferably be within certain definite limits because if too weak it may offer too high an impedance in the circuit and if too strong it might attack the light-sensitive surface and form a surface product thereon thereby destroying the light-sensitive quality thereof or it may produce a light absorbing compound in the conducting medium.

9. Where the conducting medium has the quality of absorbing light a minimum of light may be absorbed by placing the light-sensitive electrode as near as possible to the window or light admitting opening.

The invention has been illustrated in the accompanying drawings in which.

Figure 1:
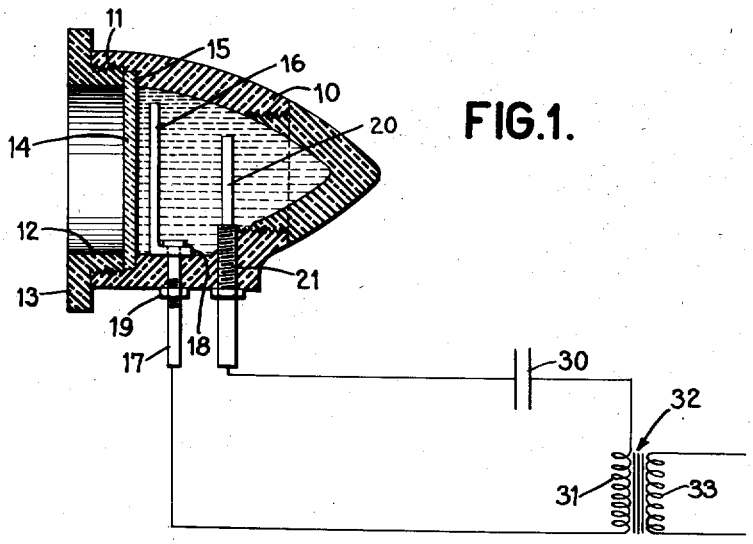
Fig. 1 is a sectional side elevation of a light-sensitive cell embodying the invention and showing the circuit connections therefor.

In Fig. 1 I have shown a convenient type of light-sensitive cell in which a casing 10 of suitable dielectric material such as bakelite may be provided with an opening 11 which is threaded on the inner side thereof to receive the threaded inwardly extending portion 12 of a rim 13. A glass lens or window 14 may be held in place by the rim 13 against a shoulder 15 formed on the inside of the opening 11. The glass 14 has a liquid tight connection to prevent leakage of liquid if liquid is used as the conducting medium.

The light-sensitive element 16 may be mounted inside of the casing 10 by means of a headed pin 17 which passes through a foot 18 provided integral with the light-sensitive element. The pin 17 may be secured by a suitable nut 19 which may be threaded thereupon and brought tight against the lower outer wall of the casing which is flattened at that point, as indicated, to receive it. The cooperating electrode 20 may comprise a pin having a threaded portion 21 which may be threaded into a hole provided for that purpose in the casing wall at the base thereof as indicated.

Figure 2:
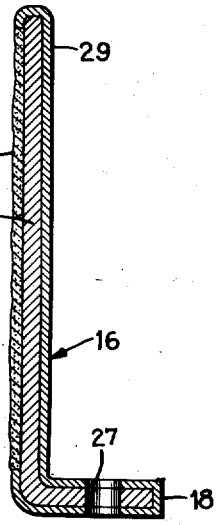
Fig. 2 is a sectional elevation through the light-sensitive element shown in Fig. 1.
Figure 3:
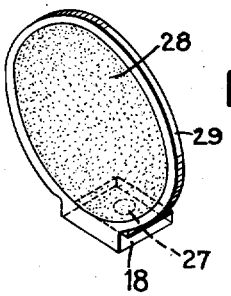
Fig. 3 is a perspective view of the light-sensitive element shown in Fig. 1.

The light-sensitive surface is preferably formed from a copper base, such as is disclosed in my co-pending application S. N. 301,684 filed 23 August 1928 in which is shown a light-sensitive electrode composed of copper having a thermally integrally-formed cuprous oxide layer, a co-operating electrode such as zinc or magnesium and an electrolyte containing cobalt chloride. Thus the copper disc 25 (Fig. 2) which forms the electrode 16 is preferably electrolytic copper and may be formed with the foot 18 provided with a hole 27 to secure the electrode in position. The disc 25 may be heated in a furnace in air to approximately 1000° C. and for a period of time sufficient to form a coating 28 of cuprous oxide of desired thickness on one side thereof. The furnace may then be turned off and the electrode may be allowed to cool down with the furnace till it reaches room temperature. The extreme outer surface of the oxide may take on an extra atom of oxygen to the molecule so that it becomes cupric oxide instead of cuprous oxide and as cupric oxide does not appear to be as sensitive to light and is opaque I prefer to remove all traces of the cupric oxide by immersing the electrode in a bath of hydrochloric acid. After this treatment the electrode is preferably treated to remove the product of the hydrochloric acid reaction as for example by immersing it in concentrated nitric acid. The nitric acid may then be removed by washing the electrode with distilled water.

Figure 6:
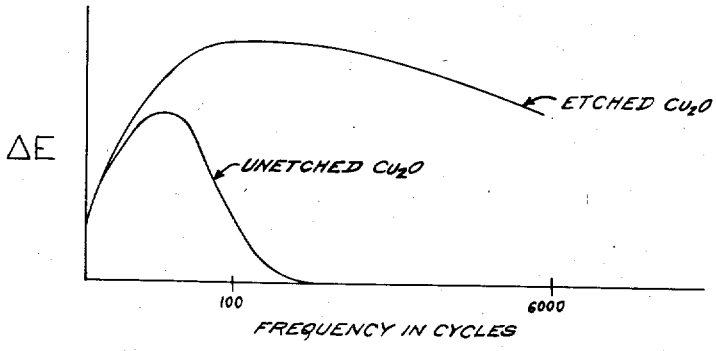
Fig. 6 is a graph showing the output difference between two cuprous oxide electrodes, one etched and the other unetched.

I have found that by etching the surface of the light-sensitive material to expose its crystalline structure it will respond to very much higher frequencies than when the surface is not etched and the difference between an etched and an unetched surface is indicated by the graphs shown in Fig. 6 where the differential potential of the cell, or the difference between dark and light potentials, is measured on the ordinate while the number of cycles is measured on the abscissa. The unetched surface has its maximum response under 100 cycles, falling off sharply near that point, while the etched surface maintains its response over a wide range up to a point in the order of 6000 cycles. The etching, which may be accomplished by immersing the electrode in a 10% solution of sulphuric acid, appears to not only increase the absorption surface or actual working area of the electrode but it seems to help prevent localized voltaic and photo-chemical effects. The etching preferably should be as uniform as possible in order to prevent inactive areas which reduce the sensitivity of the cell and perhaps cause local circuits which shorten the life thereof. When the etching has been completed a dense homogeneous layer of crystalline cuprous oxide is left on the surface of the copper disc and after the surface has been cleansed with distilled water and when all other portions of the disc have been covered by an insulating paint 29 such as asphaltum paint the electrode is ready to mount in the light-sensitive cell.

A photo-sensitive electrode comprising a copper base having a thermally-integrally-formed cuprous oxide layer, chemically etched to expose the crystalline structure so as to give an efficient response to light modulations of high speed, is disclosed in my copending application S. N. 331,943 filed 11 January 1929. A similar etching is also shown in my co-pending application S. N. 412,077 filed 6 December 1929.

The cooperating electrode 20 may be of any desired metal or compound as will be hereinafter described depending on the type of light-sensitive material used and the conducting medium.

In Fig. 1 the light-sensitive cell is shown connected in series with a condenser 30 and primary 31 of a transformer 32 the secondary 33 of which may be connected to the input of an amplifier (not shown) for suitably increasing the impulse produced by the light sensitive cell. In this capacity circuit the condenser 30 prevents any direct current flow through the light-sensitive cell between the electrodes 16 and 20 and therefore minimizes any electrolytic or electro-chemical actions between the electrodes.

Figure 4:
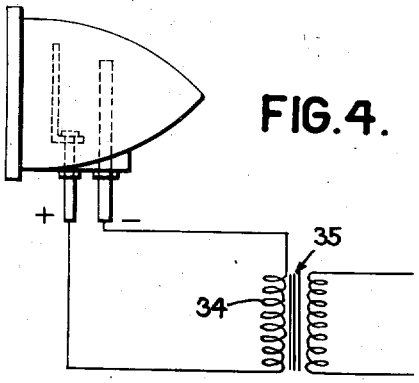
Fig. 4 is a diagrammatic representation of a conductive circuit for the light sensitive cell.
Figure 5:
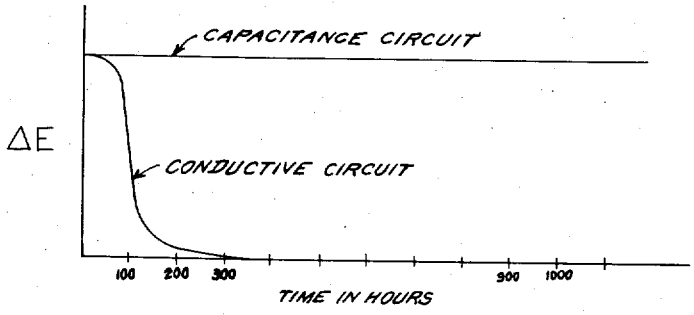
Fig. 5 is a pair of graphs illustrating the difference in life of the light-sensitive cell when connected in two different kinds of circuits.

Figure 5 shows output curves in which, in one instance, the cell is directly or conductively coupled to the output transformer as shown in Fig. 4, as compared, in the other instance, to a cell which is coupled to the output transformer through a capacitance as shown in Fig. 1.

The potential difference of the cell is measured on the ordinate and the time in hours is measured on the abscissa. It will be noted that in a conductive circuit the potential difference falls down practically to zero at the end of 100 hours while in a capacitance circuit the maximum potent'al difference is maintained even beyond 1,000 hours. These figures are based on a light-sensitive electrode having an area of about ¾ of a square inch and would be different with electrodes of different areas or where different load resistances were used.

In Fig. 4 the primary winding 34 of a transformer 35 is shown connected directly across the terminals of the light-sensitive cell so that any potential difference generated between the elements of the cell will cause current to flow in the circuit through the winding 34 and therefore through the conducting medium between the light-sensitive elements and the cooperating element. With this circuit there will be a tendency for electrolytic action between the electrodes but suitable choice of a cooperating electrode as well as the conducting medium will keep such action to a minimum.

Figure 10:
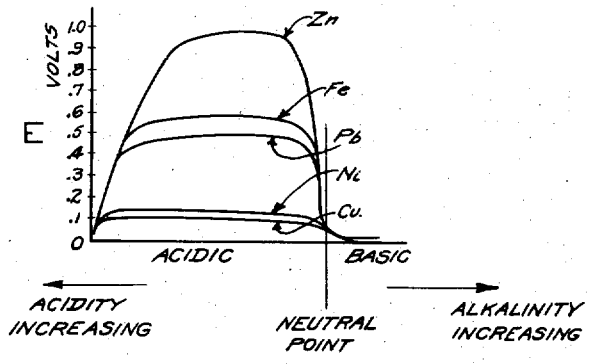
Fig. 10 is a series of graphs illustrating the effects with the cell in a conductive circuit of a plurality of different metals for the cooperating electrodes.

By experiment I have found that a conducting medium with a slightly acidic action is preferred for response to audio frequencies and for giving a long life to the cell. If an organic acid solution of about one-half percent concentration is used for the conductive medium a cell with a cuprous oxide light-sensitive electrode such as shown in Fig. 1 will give excellent dynamic response. In my copending applications S. N. 412,077, filed 6 December 1929 and S. N. 424,509 filed 30 January 1930, an electrolyte containing a weak solution of an organic acid such as citric, butyric or oxalic acid, is described. This response is indicated in Fig. 10 where a graph showing the percentage of concentration of the acid solution is measured along the abscissa and the differential potential response is measured on the ordinate. As the acid is increased up to one-half of one percent the potential of the cell increases to a maximum point giving good results and then if potassium hydrate is added slowly to neutralize the acid the potential difference falls off as indicated in the curve until when the solution is substantially neutral it has reached a point so as to be barely perceptible.

This differential potential represents the dynamic response of the cell under influence of modulated light at audio frequencies. When more potassium hydrate is added so as to give the solution a basic reaction there appears to be substantially no differential potential at all. In the case of the cuprous oxide light-sensitive material this would appear to indicate that the contact potential difference of the oxide is opposite in an alkaline solution to that when it is in an acid solution probably due to the hydrogen ion content of the electrolyte, or due perhaps to the asymmetrical characteristic of the cuprous oxide layer on the copper electrode, for instance the uni-lateral conductivity thereof, and the current flow or response to light is blocked. If an external source of potential is applied with its cathode connected to the cuprous oxide in a weak alkaline solution a response can be obtained but with a short life due to electrolytic effects.

Figure 7:
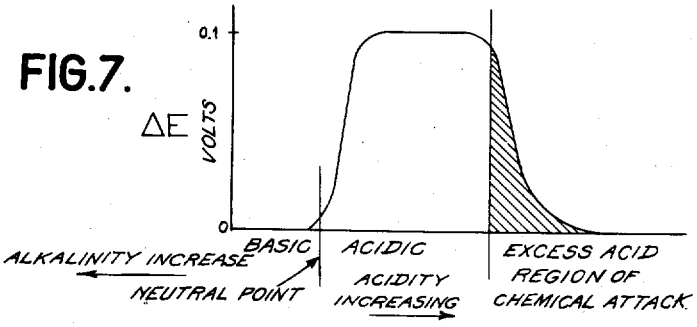
Fig. 7 is a graph showing the different effects of conducting mediums for the cell having acidic and basic reactions.

If after the output has fallen to zero more acid is added it may be caused to rise to the normal value again. I have checked this result by starting with a basic solution as indicated by the graph of Fig. 7 and adding lactic acid until the basic solution was neutralized. At this point the output potential of the cell begins to rise and as the acid content is increased the output rises until it reaches its high point similar to that already described in connection with Fig. 10. However as the acid is increased in the solution a point is reached when it begins to attack the light-sensitive electrode. This causes the voltage output to decrease rather rapidly due to two effects: The first is probably due to the electro-chemical effect on the light-sensitive surface reducing its sensitivity and the second to the fact that the product of the chemical action is distributed in the liquid conducting medium and on the light-sensitive electrode surface as a film, thereby increasing light absorption.

Figure 8:
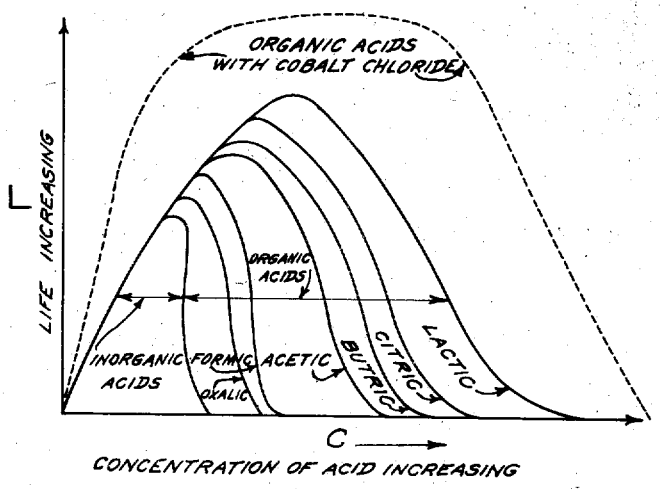
Fig. 8 is a series of graphs illustrating the effect on the life of the cell of a number of different acids used for the conductive medium.

In Fig. 8 where L represents relative life and C represents acidic concentration I have illustrated the effect of a number of different acids upon the life of the cell by a series of curves where the vertical measurements represent life of the cell and the horizontal concentration of the acid. As has been stated before when the acid becomes too strong it attacks the light-sensitive surface causing a diminution of the response thereof. From an inspection of the graphs it will be seen that an inorganic acid such as hydrochloric, nitric, sulphuric, hydrofluoric, hydrobromic, hydroiodic, and phosphoric acid causes the life of the cell to fall off by attacking the light-sensitive electrode at relatively low concentration of the acid. The organic acids permit a longer life with greater concentration and the following are indicated by the graphs in the order of their effect upon the life of the cell: oxalic acid, formic acid, acetic acid, butyric acid, citric acid, and lactic acid, the latter appearing to permit the greatest concentration without attacking the light-sensitive material.

Other conductive solutions may be used if desired such as chlorides, iodides, fluorides, and bromides, of sodium, potassium, magnesium, beryllium, aluminum, strontium, rubidium, cæsium, lithium, and others including the chlorides of iron, nickel, and cobalt. All of these salt solutions appear to be operable in a conducting circuit such as is shown in Fig. 4 but cobalt chloride is preferably the one operable in a capacitance circuit.

Figure 9:
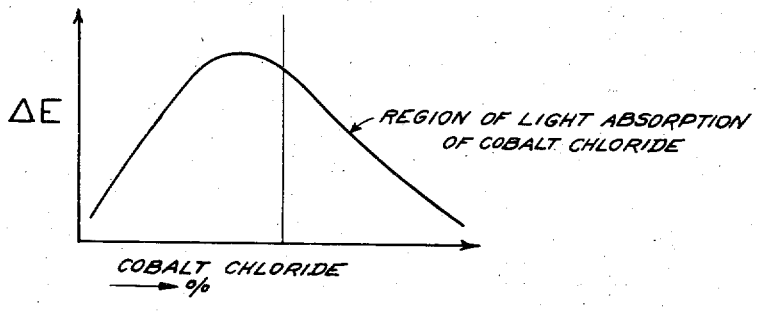
Fig. 9 is a graph showing the effect of a cobalt chloride solution as the conducting medium for use in the cells.

Fig. 9 shows a graph similar to those of Figs. 10 and 7 but illustrating the operation of a cell with cobalt chloride. As the concentration of cobalt chloride increases a point is reached where the pink color of the cobalt chloride begins to absorb the light and thereby cut down the potential difference in the cell. If the cobalt chloride is made basic by the addition of potassium hydrate the output potential drops down to zero as in the case illustrated in Figs. 10 and 7.

Where a capacitance circuit is used there appears to be very little difference in the output of the cell when different metals are used for the cooperating electrode but when the cell is used in a conductive circuit the metal out of which the cooperating electrode is made appears to have considerable effect upon the output potential. Thus in Fig. 10 I have illustrated by means of a series of graphs the contact potential difference of cells having cuprous oxide light-sensitive surfaces used in a conductive circuit with different metals for the cooperating electrodes. In this figure it will be noted that the metals are indicated in the order of their potentials as follows: zinc, iron, lead, nickel and copper. From actual experiment the voltage output for these different metals was as follows:

| | Volts |
|---|---|
| Zinc | 0.98 |
| Iron | 0.59 |
| Lead | 0.50 |
| Nickel | 0.13 |
| Copper | 0.10 |

When the cell is operating in a conductive circuit and with an electro-positive electrode, such as zinc, the operation of the cell is somewhat different than a capacitance circuit. In such an arrangement the cell acts more like a valve, for the zinc generates a large potential with respect to the light-sensitive material and the electrolyte used, but the current flow is regulated due to the internal resistance change of the cell as governed by the change of contact potential of the light-sensitive surface and the electrolyte and the change of the internal resistance of the translucent and exposed light-sensitive surface. Thus the final potential generated by the cell is governed by that generated by the zinc electrode and particular electrolyte used. With lactic acid 0.98 of a volt was obtained when exposed to light and with hydrofluoric acid 1.08 volts was generated.

When photo-electric cells of this type are used in a circuit where current can flow between the two electrodes there is an electrolytic effect upon the electrodes with rapid destruction of the photo-sensitive surface. This action is not purely photo-chemical as it occurs only when the circuit has been completed so that the photocell operates as a voltaic cell.

The life of a cell of this type appears to depend on the area of the photo-sensitive electrode and upon the potential difference between that electrode and the cooperating electrode. Thus with a cell having a zinc cooperating electrode the life is shorter than one having a nickel electrode.

Operation in a capacitance circuit is highly desirable because for efficient operation in a conductive circuit with the external resistance equal to the cell resistance due to electrolytic effects with both dark and light current a cell with an area of one square inch of exposed surface may have a life of about 20 continuous hours. Where the cell so connected is allowed to stand without a load for periods of time the layer of cuprous oxide and copper that is formed may slowly dissolve into the electrolyte so that the cell is recuperated. The life of the cell will then depend on the number of recuperation periods and the lengths of these periods as compared with the lengths of the operating periods and both of the electrodes are slowly dissolved into the electrolyte. Another undesirable feature of depending upon the chemical restoration of the photo-sensitive electrode is that the product of the action, at least where a cuprous oxide electrode is used, by the dissolution into the solution will color the electrolyte and greatly increase the absorption of light by the coloring compound in the electrolyte. By use of the capacitance coupling as indicated in Fig. 1 light-sensitive cells with cuprous oxide electrodes may be continuously operated for thousands of hours without showing a trace of electrolytic effects, reduction of sensitivity, or change in initial characteristics.

The use of capacitance coupling also prevents current flow and allows the cell to remain in the amplifier circuit without having to be electrically disconnected when not in use which is apparently necessary with the photo-voltaic cell or a cuprous oxide contact potential cell in a conducting circuit.

I have indicated above that acids may be used in the cell and also that certain salts may be used to advantage and I have discovered that in some instances a high output could be obtained without increasing the chemical attack on the cuprous oxide surface, where it is used, if instead of using solely an acid a combination of the acid and a salt of the acid, especially a copper salt, is used, for example a solution of lactic acid and cuprous lactate, or acetic acid and cuprous acetate, or citric acid and copper citrate, but in all these combinations I prefer to keep the salt content of the solution to a relatively low value as it tends to increase the absorption of light. The proper concentrations of acids, however, gives as good if not better results and eliminates light absorption to a large extent. The weak organic acids such as lactic, acetic, or citric acid, in the order named, give the longest life and the inorganic acids unless diluted to percentages much less than one-half of one percent chemically affect the life of the cell. In general the life is dependent upon the rate of attack of the acid on the light-sensitive material. This also applies to organic acids for if they are too concentrated (more than two percent) they may chemically attack the electrode cutting down the life of the cell.

Where the cell is used in a capacitance circuit minimum electrolytic effects may be obtained by keeping the inherent potential of the cooperating electrode with the light-sensitive electrode as little electropositive as possible and preferably slightly electronegative. This may be done by forming a sulphide on the surface of the cooperating electrode as by heating it in the presence of sulphur atmosphere. In my co-pending application S. N. 347,726, filed 16 March 1929, there is described a cell utilizing the thermally-formed copper-cuprous oxide light-sensitive electrode in combination with an electrode which is electronegative with respect thereto, in order to reduce the polarization potential to a minimum. In my application S. N. 412,077, a co-operating copper sulphide electrode is described and used for the same purpose.

Those salts which tend to form basic solutions when electrolized give practically no response when in a capacitance circuit. The effect of such salts is shown in the accompanying table:

| | E. light | E. dark | ΔE | |
|---|---|---|---|---|
| KOH | .60 | .60 | 0 | With zinc and cuprous oxide electrodes. |
| NaCl | .92 | .93 | .01 | |
| KCl | .93 | .94 | .01 | |

I have found that one of the reasons why the output of a cell drops over a period of time, as has already been pointed out above, is the chemical attack of the electrolyte on the light-sensitive surface especially if a strong acid is used which produces a small amount of cuprous salt such as cuprous acetate having a blue coloring and therefore increasing the absorption of light. It is for this reason that I prefer a weak lactic acid electrolyte because it reacts to a minimum amount with the cuprous oxide electrode and the cooperating electrode. This action may be further minimized by using ethyleneglycol of glycerine for the acid diluting material instead of water. This will materially reduce the chemical effect and consequent cause of light absorption. This is also one of the reasons why I prefer to keep the light-sensitive surface as close as possible to the glass window as stated above. In my co-pending application S. N. 306,607 filed 17 September 1928, there is described a cell utilizing a thermally formed light sensitive copper-cuprous oxide electrode immersed in an electrolyte containing glycerine. In my co-pending application S. N. 412,077 filed 6 December 1929, is disclosed an electrolyte containing glycerine or ethyl glycol.

Certain metallic salts when dissociated may form acidic salts, as cobalt chloride which can dissociate into hydrochloric acid.

A cell constructed in accordance with the principles as above described has a relatively low impedance which may be in the neighborhood of 1500 ohms.

Many modifications of the invention may be resorted to without departing from the spirit thereof and I do not therefore desire to limit the invention except as such limitations occur in the appended claims.

What I claim is:

1. A photo-voltaic cell having a container, a photo-sensitive electrode comprising a copper base having a thermally-integrally-formed, etched, crystalline cuprous oxide surface, a cooperating electrode and an electrolyte in contact with both electrodes.

2. A photo-voltaic cell as described in claim 1 in which the cooperating electrode is composed of copper.

3. A photo-voltaic cell as described in claim 1 in which the cooperating electrode is composed of zinc.

4. A photo-voltaic cell as described in claim 1 in which the cooperating electrode is composed of a material electronegative with respect to said cuprous oxide.

5. A photo-voltaic cell having a container, a photo-sensitive electrode comprising a copper base having a thermally-integrally-formed, etched, crystalline cuprous oxide surface, a cooperating electrode and an electrolyte containing an acid.

6. A photo-voltaic cell as described in claim 5 in which the electrolyte contains lactic acid.

7. A photo-voltaic cell having a container, a photo-sensitive electrode comprising a copper base having a thermally-integrally-formed, etched, crystalline cuprous oxide surface, a cooperating electrode and an electrolyte containing a haloid solution in contact with both electrodes.

8. A photo-voltaic cell as described in claim 7 in which the cooperating electrode is composed of copper.

9. A photo-voltaic cell having a container, a photosensitive electrode comprising a copper base having a thermally-integrally-formed, crystalline cuprous oxide surface, a cooperating electrode and an electrolyte containing cobalt chloride in contact with both electrodes.

10. A photo-voltaic cell having a container, a photo-sensitive electrode comprising a copper base having a thermally - integrally - formed, crystalline cuprous oxide surface, a cooperating electrode and an electrolyte in contact with both electrodes.

11. A photo-voltaic cell as described in claim 10 in which the electrolyte has an acidic reaction.

12. A photo-voltaic cell as described in claim 10 in which the electrolyte has a tendency to form an acidic solution of a salt.

13. A photo-voltaic cell as described in claim 10 in which the electrolyte is composed of one of the compounds ethylene glycol and glycerine, containing a conductive medium.

14. A photo-voltaic cell as described in claim 10 in which the electrolyte is composed of one of the compounds ethylene glycol and glycerine, and a weak acid.

15. A photo-voltaic cell as described in claim 10 in which the electrolyte is composed of one of the compounds ethylene glycol and glycerine, and an organic acid.

16. A photo-voltaic cell as described in claim 10 in which the electrolyte is composed of one of the compounds ethylene glycol and glycerine, and an inorganic acid.

17. A photo-voltaic cell as described in claim 10 in which the electrolyte is composed of one of the compounds ethylene glycol and glycerine and an organic acid of a concentration less than 2%.

18. A photo-voltaic cell as described in claim 10 in which the electrolyte is composed of one of the compounds ethylene glycol and glycerine and an inorganic acid of a concentration less than ½%.

19. A photo-voltaic cell as described in claim 10 in which the cooperating electrode is composed of a material electropositive with respect to said cuprous oxide.

20. A photo-voltaic cell as described in claim 10 in which the cooperating electrode is composed of zinc.

21. A photo-voltaic cell as described in claim 10 in which the cooperating electrode is composed of iron.

22. A photo-electric cell having a copper anode with a thermally-integrally-formed layer of cuprous oxide and a cooperating cathode electropositive with respect to the anode, immersed in an electrolyte composed of cobalt chloride.

SAMUEL RUBEN.